(12) United States Patent
Huang et al.

(10) Patent No.: US 8,091,214 B2
(45) Date of Patent: Jan. 10, 2012

(54) ASSEMBLING JIG FOR LENS MODULE

(75) Inventors: Jyun-Lin Huang, Tu-Cheng (TW);
Kuo-Chuan Chiu, Tu-Cheng (TW);
Chin-Chou Wang, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 153 days.

(21) Appl. No.: 12/714,281

(22) Filed: Feb. 26, 2010

(65) Prior Publication Data

US 2011/0209342 A1 Sep. 1, 2011

(51) Int. Cl.
*B23P 19/00* (2006.01)

(52) U.S. Cl. ............. 29/729; 29/739; 29/700; 29/592.1; 118/500

(58) Field of Classification Search .............. 29/729, 29/739, 761–764, 832, 509, 513, 243.5, 255; 118/500–504
See application file for complete search history.

(56) References Cited

U.S. PATENT DOCUMENTS

| | | | | |
|---|---|---|---|---|
| 6,230,070 B1 * | 5/2001 | Yodoshi | ........................ | 700/162 |
| 6,448,529 B1 * | 9/2002 | Hiraishi et al. | ............ | 219/69.16 |
| 6,860,001 B2 * | 3/2005 | Henghuber | ..................... | 29/729 |
| 7,992,286 B2 * | 8/2011 | Liang | .............................. | 29/729 |
| 8,015,680 B2 * | 9/2011 | Feng et al. | ..................... | 29/33 K |
| 2011/0209342 A1 * | 9/2011 | Huang et al. | .................... | 29/729 |

* cited by examiner

*Primary Examiner* — Minh Trinh
(74) *Attorney, Agent, or Firm* — Cheng-Ju Chiang

(57) ABSTRACT

An assembling jig for lens module comprises a crutch, a mobile carrier and a pressing mechanism. The crutch includes a level mounting base and an erect support wall joined to one side of the mounting base. A firm carrier is fixed on the mounting base. The mobile carrier fixed on the firm carrier comprises a carrier base, several positioning blocks disposed around the top surface of the carrier base, the positioning blocks surrounding a restraining groove in which a PCB with a lens socket is received. The pressing mechanism disposed on the support wall includes a pressing member can move up and down and a drive gear connected to one end of the pressing member. This kind of lens module component assembling jig features in assembling lens component steadily and can be applied to different kinds of lens component. Thus it abates the cost of assembling the lens component.

6 Claims, 5 Drawing Sheets

ASSEMBLING JIG FOR LENS MODULE

BACKGROUND OF THE INVENTION

1. Field of the Invention

The present invention relates to an assembling jig, and particularly to an assembling jig adapted for assembling a lens component to a lens socket which is soldered on a printed circuit board (PCB).

2. The Related Art

With the development of electronic technology, portable electronic devices, such as mobile phones, personal digital assistants (PDA) and the like, are now in widespread used. The portable electronic device including image capture device is becoming increasingly fashionable, the high-quality captured images bring people a lot of fun in daily life. The trend of miniaturization of portable electronic device requires the lens module to be small, thin and lightweight in construction. How to assemble the above lens component to a lens socket soldered on a PCB of a portable electronic device becomes increasingly challenge.

A conventional method to assemble the lens module is doing by hands. In this method there are numerous uncertainty factors, such as improper force, in a process of lens module assembling, which may abate the capability of the lens module. Another method to finish the lens module assembly is using some assembling jigs for replacing the hands. Though the assembling jigs diminish the influence caused by man, a characteristic of being used to a special kind of lens module may lead the cost of the lens module assembly to become high.

It is significant to design a lens module assembling jig capable of assembling a lens module steadily and be applied to various kinds of lens modules.

SUMMARY OF THE INVENTION

Accordingly, an object of the present invention is to provide a lens component assembling jig. A lens component assembling jig comprises a crutch, a mobile carrier and a pressing mechanism. The crutch includes a level mounting base and an erect support wall joined to one side of the mounting base. A firm carrier is fixed on the mounting base. The mobile carrier fixed on the firm carrier comprises a carrier base, several positioning blocks disposed around the top surface of the carrier base, the positioning blocks surrounding a restraining groove in which a PCB with a lens socket is received. The pressing mechanism disposed on the support wall includes a pressing member can move up and down and a drive gear connected to one end of the pressing member.

As described above, the pressing mechanism presses the lens component into the lens socket which is received in the restraining groove of the mobile carrier together with a PCB. The lens component assembling jig provides an even force and diminishes the effect of the artificial factor, so it can ensure the lens component assembling steadily. Though replacing some parts and adjusting the relative position of the elements, the lens component jig can be used to kinds of lens components, thus abates the cost of lens component assembling.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
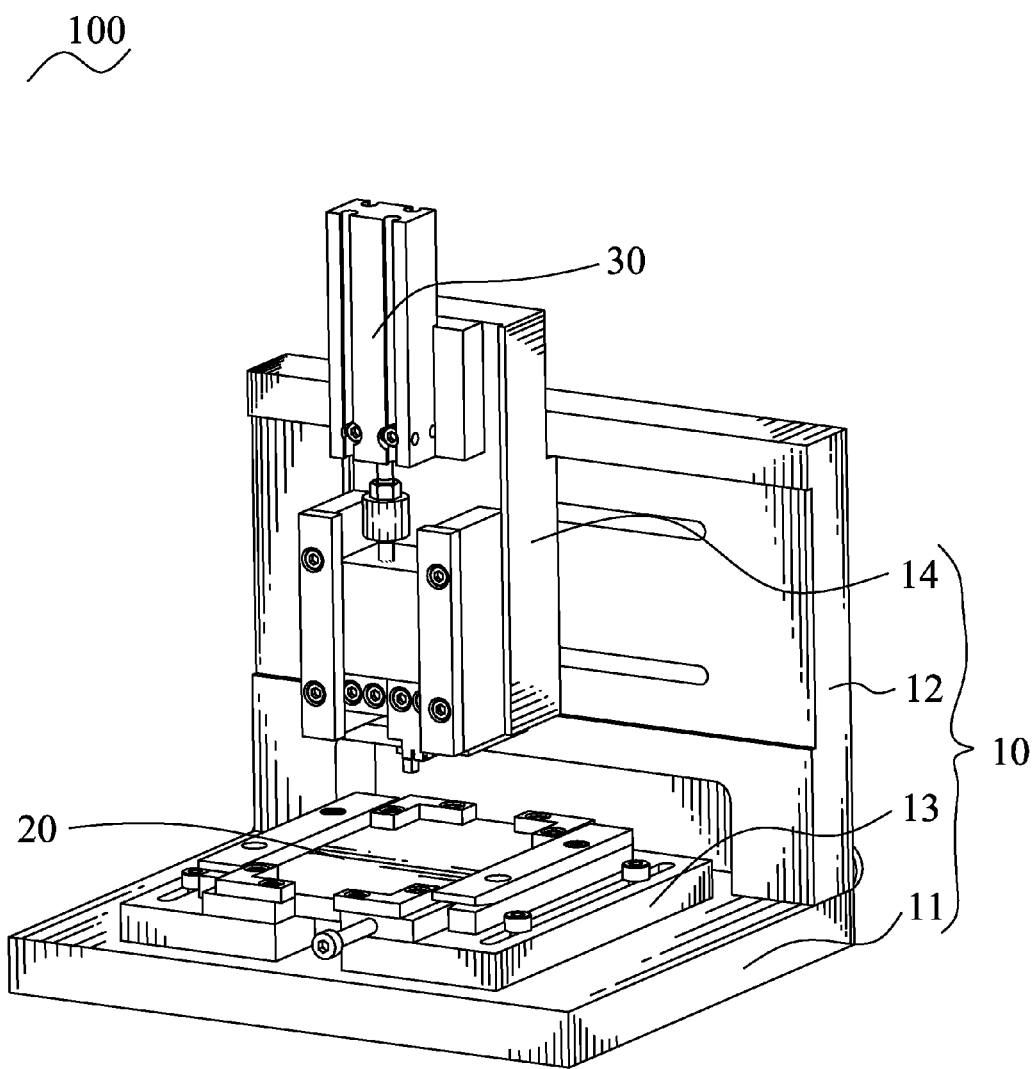
FIG. 1 is a perspective view of an assembling jig for lens module of an embodiment in accordance with the present invention.

Referring to FIG. 1, an assembling jig for lens module 100 of an embodiment in accordance with the present invention comprises a crutch 10, a mobile carrier 20 and a pressing mechanism 30. The crutch 10 includes a level mounting base 11 and a support wall 12 vertically joined to a rear end of the level mounting base 11 to show an L shape. A firm carrier 13 is fixed on the mounting base 11. The support wall 12 has a support block 14 movably disposed on a front surface thereof. The mobile carrier 20 is inserted in the firm carrier 13. The pressing mechanism 30 is vertically disposed on a substantially middle portion of the support block 14.

Figure 2:
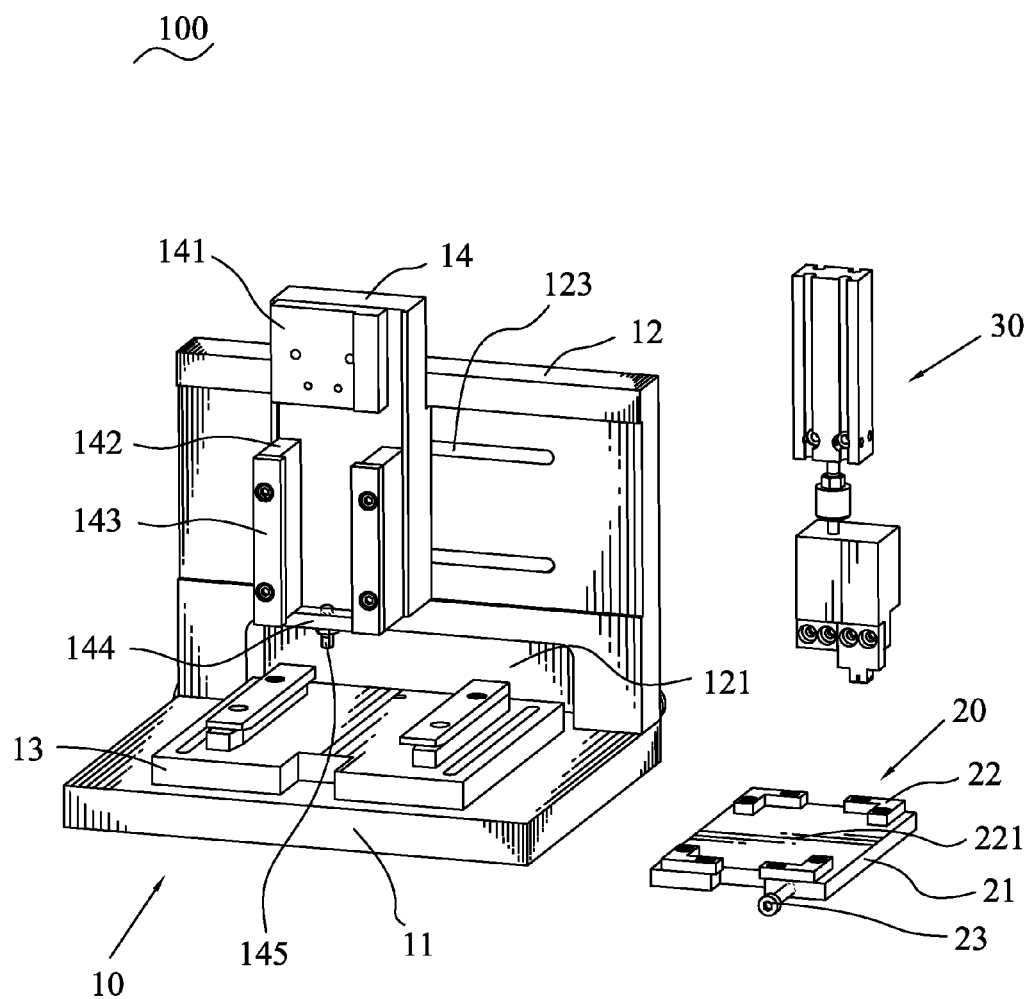
FIG. 2 is an exploded, perspective view of the assembling jig for lens module shown in FIG. 1.
Figure 3:
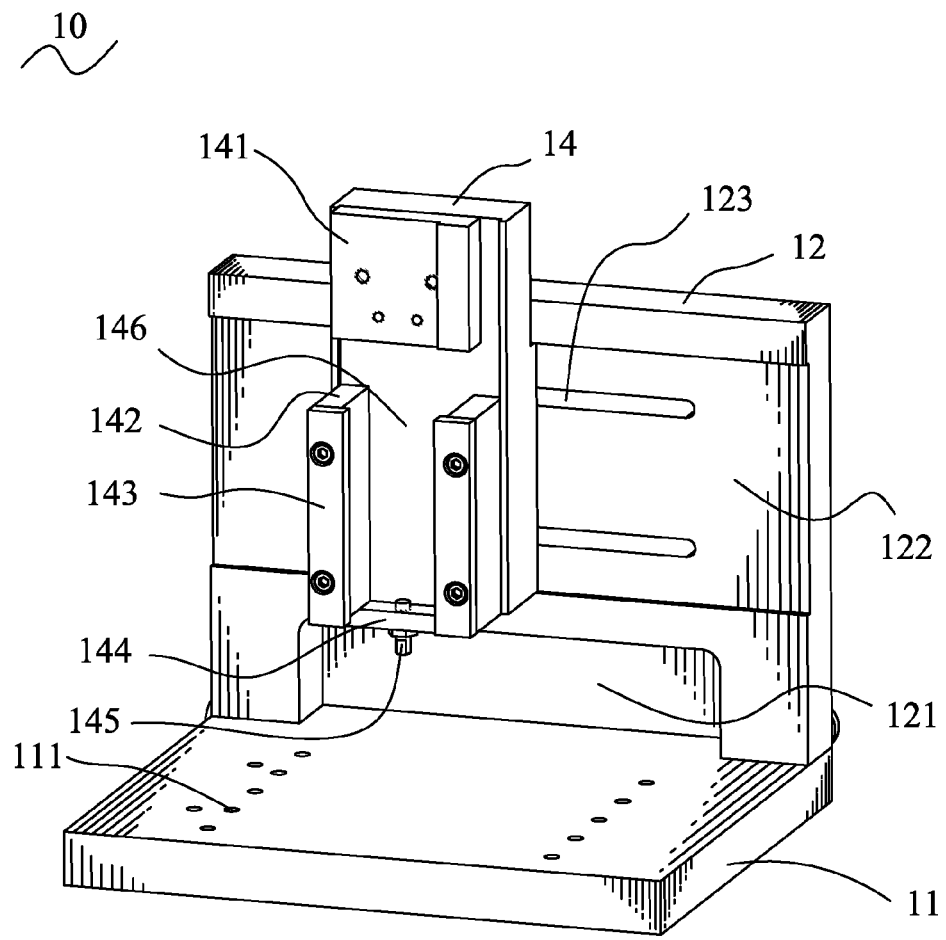
FIG. 3 is an exploded, perspective view of a crutch of the assembling jig for lens module shown in FIG. 1.
Figure 3:
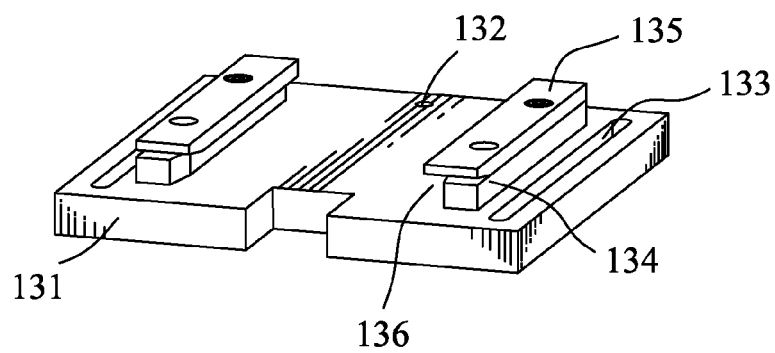

Referring to FIGS. 2-3, the level mounting base 11 has two lines of holes 111 distributed on both sides thereof, parallel to each other. The firm carrier 13 is disposed on the mounting base 11. The firm carrier 13 comprises a base plate 131. Near a middle rear portion of the base plate 131 there is a locating hole 132. A locating piece (not shown) is inserted into the locating hole 132 to decide the position of a mobile carrier 20. The base plate 131 has two bar slots 133 disposed on both sides thereof, corresponding to the two lines of holes 111 of the level mounting base 11. Some fasteners 137 (shown in FIG. 5) pass through the bar slots 133 to engage with the holes 111 for movably fixing the firm carrier 13 on the mounting base 11. Two rectangular connecting blocks 134 are inward disposed adjacent to inner sides of the respective bar slots 133 and extending parallel to the bar slots 133. Each connecting block 134 has a rectangular stopping plate 135 disposed on a top surface thereof. Each stopping plate 135 extends into a space formed by the two connecting block 134. The base plate 131, the connecting blocks 134 and the stopping plates 135 form an insertion groove 136 for receiving the mobile carrier 20.

The support wall 12 is vertically joined to a rear end of the mounting base 11 to show an L shape. The rectangle support wall 12 has a rectangle notch 121 disposed in a substantially middle portion of a lower end thereof. The notch 121 is disposed sidelong to an inserting direction of the mobile carrier 20 and communicated with the mounting base 11. The notch 121 allows the firm carrier 13 to stretch out the support wall 12. The support wall 12 also has a receiving groove 122 disposed at an upper end thereof, above the notch 121. The receiving groove 122 passes through the whole front surface of the support wall 12. Two bar fixing slots 123 paralleling to each other are disposed in the receiving groove 121 and sidelong to the inserting direction of the mobile carrier 20. A rear surface of a support block 14 forms a bump to match with the receiving groove 122 so that the support block 14 moves along the support wall 12 with the bump thereof moving along the receiving groove 122. Some fasteners (not shown) pass through the fixing slots 123 to engage with corresponding holes of the support block 14 for fixing the support block 14 to the receiving groove 122 of the support wall 12. The support block 14 includes a locking block 141 disposed on an upper end of a front surface thereof. Two locating strips 142 are respectively disposed on two sides of the front surface of the support block 14. Lower end sides of the locating strips 142 are flush with that of the support block 14. Each locating strip 142 has a stopping plate 143 on the front surface thereof. Each stopping plate 143 has a portion thereof extending into a space formed by the two locating strips 142. There is a locating plate 144 disposed on a lower end side of the support block 14 between the locating strips 142 and connecting the end sides of the locating strips 142 together. The support block 14, the locating strips 142, the stopping plates 143 and the locating plate 144 surround a chute 146. The locating plate 144 has a lock member 145 at a bottom thereof. The lock member 145 passes through the locating plate 144 and extends into the chute 146.

The mobile carrier 20 is inserted into the insertion groove 136 and fixed therein. The mobile carrier 20 comprises a carrier base 21, four L-shaped positioning blocks 22 which are distributed on four corners of the carrier base 21, and a handle 23 disposed at a front end of the carrier base 21. The carrier base 21 and the four positioning blocks 22 surround a square locating groove 221 for receiving a PCB. When an operator wants to insert the mobile carrier 20 in or take the mobile carrier 20 out from the insertion groove 136, an outer force is acted to the handle 23.

Figure 4:
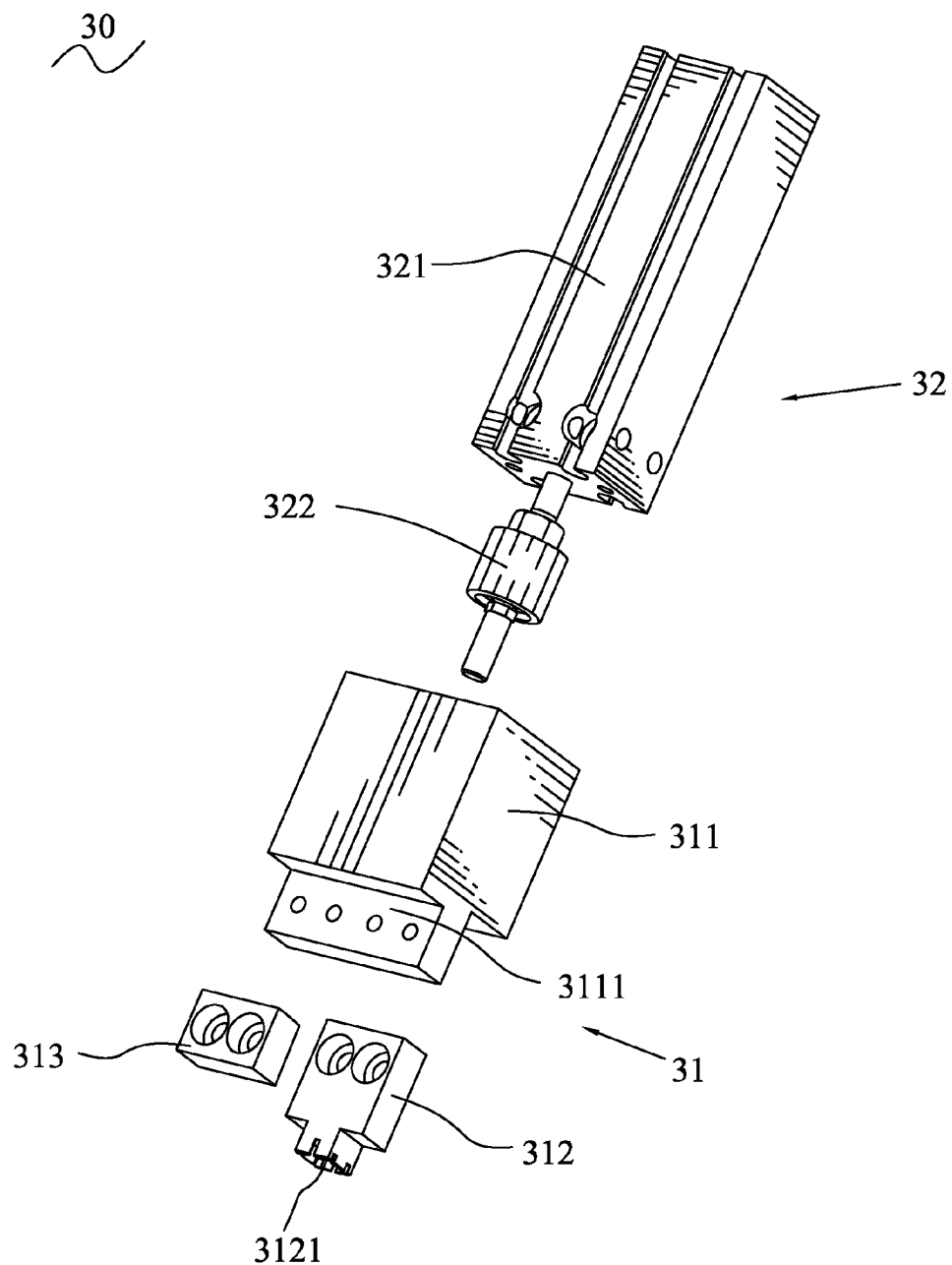
FIG. 4 is an exploded, perspective view of a pressing mechanism of the assembling jig for lens module shown in FIG. 1.

Referring to FIG. 4, the pressing mechanism 30 is disposed on the front surface of the support block 14. The pressing mechanism 30 comprises a pressing member 31 and a drive device 32 which is connected with the pressing member 31. The pressing member 31 includes a slider 311 which is joined to the drive device 32. A portion extends from a middle portion of a bottom side of the slider 311 to form a rectangle batten 3111. The batten 3111 has four through-holes linearly disposed in a middle portion thereof. A pressing block 312 is disposed on a side of the batten 3111. The pressing block 312 has two bolt holes in an upper end thereof, corresponding to the through-holes of the batten 3111, and a pressing groove 3121 extending from a bottom side thereof. Some bolts pass through the bolt holes of the pressing block 312 and the through-holes of the batten 3111 for fixing the pressing block 312. The pressing groove 3121 is used to receive a lens component 40. The pressing block 312 and the pressing groove 3121 can be changed when necessary. A locating block 313 is disposed adjacent to the pressing block 312 to help fix the pressing block 312. A side of the locating block 313 touches a side of the pressing block 312. The drive device 32 has a cylinder 321 and a shaft 322 which respectively connects the slider 311 and the cylinder 321 with both ends thereof.

Figure 5:
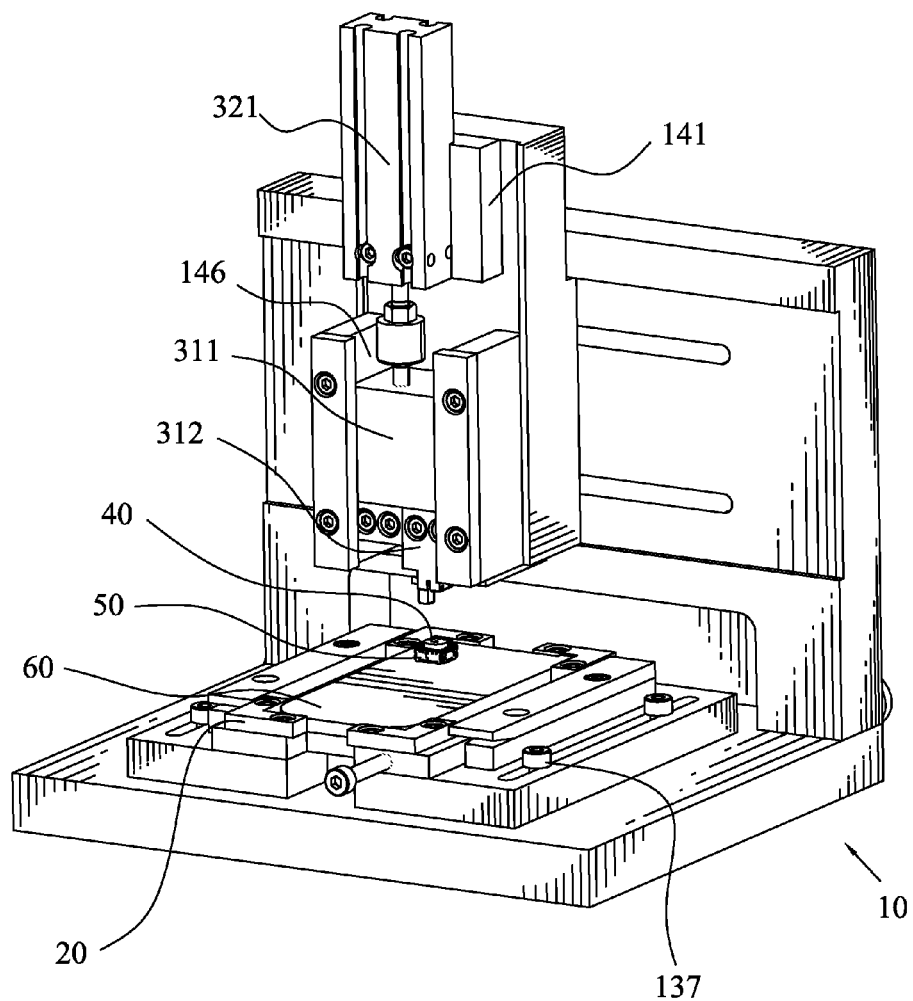
FIG. 5 is a perspective view of assembling a lens module with the assembling jig for lens module shown in FIG. 1.

Referring to FIG. 5, the cylinder 321 of the drive device 32 is located on the front surface of the locking block 141 with bolts. The pressing member 31 is received in the chute 146 and the slider 311 of the pressing member 31 moves along the chute 146 up and down. When the assembling jig for lens module 100 starts to assemble a lens component 40 to a lens socket 50 which is soldered on a PCB 60, firstly a PCB 60 having a lens socket 50 is disposed in the locating groove 221 of the mobile carrier 20, then the mobile carrier 20 together with the PCB 60 will be inserted into the insertion groove 136 of the firm carrier 13 through the handle 23. A lens component 40 is inserted in the pressing groove 3121 of the pressing block 312. The cylinder 321 drives the pressing member 31 to move downward. The pressing block 312 presses downward on a circumference of the lens component 40 for pressing the lens component 40 into the lens socket 50. Thus the lens component 40 is received in the lens socket 50. At last the cylinder 321 drives the pressing member 31 upwardly. Another lens module assembly starts after replacing the PCB 60.

As described above, the assembling jig for lens module 100 assembles the lens component 40 to the lens socket 50 through the pressing block 312, so the use of the assembling jig for lens module 100 diminishes the effect of the artificial factor in lens module assembly and ensures the process of lens module assembly steadily. Moreover, because the firm carrier 13 and the support block 14 are movably disposed, the assembling jig for lens module 100 can be applied to other kinds of lens components through replacing the original pressing block 312 with the pressing block which is corresponding to a new kind of lens component.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An assembling jig for lens module, comprising:
   a crutch, including a level mounting base and a support wall vertically joined to a side of the mounting base, a firm carrier movably fixed on the mounting base, an insertion groove formed on a top surface of the firm carrier;
   a mobile carrier inserted in the insertion groove, including a carrier base, several positioning blocks disposed around a top surface of the carrier base, the positioning blocks surrounding a restraining groove for receiving a PCB; and
   a pressing mechanism, movably disposed on the support wall, including a pressing member and a drive device connected to an end of the pressing member.

2. The assembling jig for lens module as claimed in claim 1, wherein the support wall has a receiving groove disposed on an upper end thereof, the receiving groove passes through the whole front surface of the support wall, at least two bar fixing slots are disposed in the receiving groove sidelong to an inserting direction of the mobile carrier.

3. The assembling jig for lens module as claimed in claim 2, wherein a support block is movably disposed in the receiving groove, two locating strips are respectively disposed on two sides of the front surface of the support block, each locating strip has a stopping plate on a front surface thereof, each stopping plate has a portion thereof extending into the space formed by the two locating strips, a locating plate is disposed on a bottom side of the support block, the support block, the locating strips, the stopping plates and the locating plate surround a chute.

4. The assembling jig for lens module as claimed in claim 3, wherein the locating plate has a lock member at a bottom thereof, the lock member passes through the locating plate and extends into the chute.

5. The assembling jig for lens module as claimed in claim 1, wherein the pressing member includes a slider, a batten is formed extending from a middle portion of a bottom of the slider, a pressing block is disposed on the batten with bolts, the pressing block has a pressing groove at a bottom thereof.

6. The assembling jig for lens module as claimed in claim 1, wherein said firm carrier has a carrier base plate, a locating hole is disposed near a middle rear portion of the carrier base plate to decide the position of the mobile carrier.

* * * * *